United States Patent
McKnight et al.

(10) Patent No.: US 9,791,014 B1
(45) Date of Patent: Oct. 17, 2017

(54) ENHANCED DAMPING MATERIALS USING NEGATIVE STIFFNESS INSERTS

(71) Applicant: HRL Laboratories, LLC, Malibu, CA (US)

(72) Inventors: Geoffrey P. McKnight, Los Angeles, CA (US); Chia-Ming Chang, Los Angeles, CA (US); Andrew C. Keefe, Encino, CA (US); William Carter, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 296 days.

(21) Appl. No.: 13/837,957

(22) Filed: Mar. 15, 2013

(51) Int. Cl.
*F16F 3/02* (2006.01)
*F16F 7/00* (2006.01)

(52) U.S. Cl.
CPC ................ *F16F 7/00* (2013.01); *F16F 3/026* (2013.01); *F16F 2228/063* (2013.01)

(58) Field of Classification Search
CPC .......... F16F 15/02; F16F 15/022; F16F 15/04; F16F 15/06; F16F 15/067; F16F 15/073; F16F 15/08; F16F 2228/063; F16F 1/31; F16F 3/026
See application file for complete search history.

(56) References Cited

U.S. PATENT DOCUMENTS

| | | | |
|---|---|---|---|
| 5,244,170 A * | 9/1993 | Shekher | 244/173.2 |
| 5,310,157 A | 5/1994 | Platus | |
| 5,370,352 A | 12/1994 | Platus | |
| 6,762,669 B2 | 7/2004 | Alacqua et al. | |
| 7,411,331 B2 | 8/2008 | Dubowsky et al. | |
| 7,647,733 B2 * | 1/2010 | Nakamura et al. | 52/167.1 |
| 2014/0117600 A1 * | 5/2014 | Hawkins et al. | 267/140.11 |

FOREIGN PATENT DOCUMENTS

| | | | | |
|---|---|---|---|---|
| WO | WO 2005026573 A1 * | 3/2005 | | F16F 15/03 |
| WO | WO 2013039401 A1 * | 3/2013 | | |

OTHER PUBLICATIONS

David L. Platus, Negative-stiffness-mechanism vibration isolation systems, SPIE vol. 1619 Vibration Control in Micoelectronics, Optics, and Metrology, 1991, p. 44-54.
R.S. Lakes, Extreme damping in compliant composites with a negative-stiffness phase, vol. 81, No. 2, Philosophical Magazine Letters, 2001, p. 95-100

(Continued)

*Primary Examiner* — Nicholas J Lane
(74) *Attorney, Agent, or Firm* — Christopher R. Balzan

(57) ABSTRACT

In one embodiment, a vibration control apparatus is provided having a pair of face sheets with a core material in between. The core material comprising a positive stiffness material. A stack comprising a positive stiffness structure in series with a negative stiffness structure is located between the pair of face sheets, in parallel with the core material. The stack may be embedded in the core material. Various embodiments may include multiple stacks in parallel with each other. In some embodiments, the stack may include multiple positive stiffness structures in series with multiple negative stiffness structures. The multiple positive stiffness structures and negative stiffness structures may be interleaved.

23 Claims, 4 Drawing Sheets

(56) References Cited

OTHER PUBLICATIONS

Yun-Che Wang, Roderic S. Lakes, Stable extremely-high damping discrete viscoelastic systems due to negative stiffness elements, vol. 84, No. 22, Applied Physics Letters, May 31, 2004, p. 4451-4453.
Mattias Vangbo, An analytical analysis of a compressed bistable buckled beam, Sensors and Actuators A 69, Elsevier Science S.A., 1998, p. 212-216.
Geoffrey P. McKnight, U.S. Appl. No. 12/784,809, Title: Bistable actuator mechanism, filed May 21, 2010.
Henry et al., U.S. Appl. No. 13/543,478, Title: Three port structures with negative stiffness behavior, filed Jul. 6, 2012.

* cited by examiner

ENHANCED DAMPING MATERIALS USING NEGATIVE STIFFNESS INSERTS

STATEMENT REGARDING FEDERALLY SPONSORED RESEARCH OR DEVELOPMENT

This invention was made with government support under Contract No. HR0011-08-C-0162, awarded by DARPA. The government has certain rights in this invention.

BACKGROUND

In conventional systems dealing with vibration, the focus is on vibration isolation of equipment, or vibration control of structures. Such isolation systems generally have very low effective stiffness in the direction of the damping, or conversely relatively modest damping for high stiffness structures. Currently, it is challenging, or not possible in some instances, to create systems that efficiently combine high stiffness and high damping. Furthermore, conventional low stiffness isolation systems are not practical if there are weight and volume requirements, or when scalability is required to allow integration into other materials and structures.

Some new systems employ solid state damping materials such as piezoelectric and magnetostrictive materials. While these damping materials efficiently maintain the structural stiffness, they are usually costly, heavy, and brittle. Other prior systems do not posses sufficient control over microstructures to achieve high stiffness and damping over a wide, controlled set of operating conditions.

What is needed is an efficient shock absorber and vibration damper that has superior damping performance, scalable manufacturing, light-weight design, and good structural strength. What is also needed is a lighter weight, more controllable shock absorber/vibration damper that works over a broad range of temperatures and strain spaces. Further, what is needed is the capability to create engineered responses to application loads that can be designed optimally for a variety of loading situations. What is needed in some applications is a structure that is capable of high stiffness in the direction of damping.

SUMMARY

In some embodiments, a vibration control apparatus is provided having a pair of face sheets with a core material in between. The core material comprises a positive stiffness material. A stack is located between the pair of face sheets in parallel with the core material. The stack comprises a positive stiffness structure in series with a negative stiffness structure.

In various embodiments, the stack may be embedded in the core material, which may include foam, honeycomb, or an engineered structure, such as for example a microtruss structure. In various embodiments, the positive stiffness material of the stack may include a coil, a block, a microtruss structure, a porous material, a tension wire, tension strip, or the like. In various embodiments, the negative stiffness material of the stack may include a pair of dual arms connected to a hub.

Various embodiments may include multiple stacks in parallel with each other. The stacks may be dispersed uniformly throughout the core, or the stacks may be dispersed non-uniformly throughout the core. In some embodiments, some or all of the stacks may be canted with respect to the pair of face sheets.

In some embodiments, the stack may include multiple positive stiffness structures in series with multiple negative stiffness structures. Thus, in some embodiments, the stack may include first and second positive stiffness structures in series and first and second negative stiffness structures in series with each other and in series with the first and second positive stiffness structures. In some such embodiments, the positive stiffness structures may be interleaved with the negative stiffness structures.

In yet another embodiment, a vibration control apparatus is provided which has strips of negative stiffness structures and strips of positive stiffness structures arrayed within a core. In some such embodiments, the positive stiffness structures strips may arranged orthogonally to the negative stiffness structures strips and be coupled together at their junctions. In this embodiment, the positive stiffness structures strips may be coupled to microtruss conduits, and the negative stiffness structures strips may be coupled to microtruss conduits. Face sheets may be provided such that the microtruss conduits of the positive stiffness structures are coupled to one of the face sheets, and such that the microtruss conduits of the negative stiffness structures strips are coupled to the other face sheet.

DESCRIPTION OF THE DRAWINGS

These and other features, aspects, and advantages of the principles of the present invention will become better understood with reference to the following description, appended claims, and accompanying drawings where:

DESCRIPTION

In various embodiments, a new material construction is provided that allows enhanced damping performance through means of a bistable or negative stiffness member. By using these structures in parallel with traditional materials, one can create materials with higher specific damping capacity and stiffness combinations than is possible in any known material. While negative stiffness concepts have been previously published as a means to increase damping performance, shown herein is a means to engineer these structures in new, practical ways that can be incorporated into traditional core materials (such as foams and honeycombs) to provide enhanced damping in loading perpendicular to the core material.

In various embodiments, a material construction is provided for large damping simultaneously with high specific stiffness in lightweight core materials such as foams, honeycomb, or microtruss materials. In this way, the damping can be increased by increasing the negative stiffness contribution. The damping can be tuned to desired displacement ranges and can be achieved at very low frequencies (which can be frequency independent up to a critical frequency). Additionally, impulse loads can be mitigated.

Figure 1A:
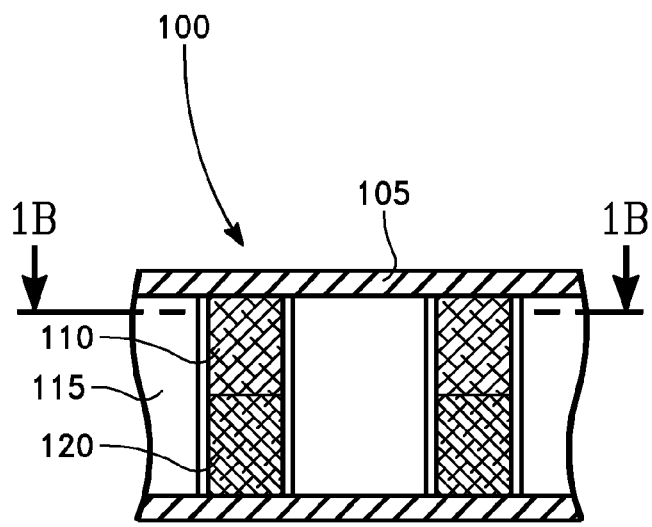
FIG. 1A is a simplified illustration showing a cross sectional side view of a vibration control apparatus in accordance with an embodiment of the present invention.
Figure 1B:
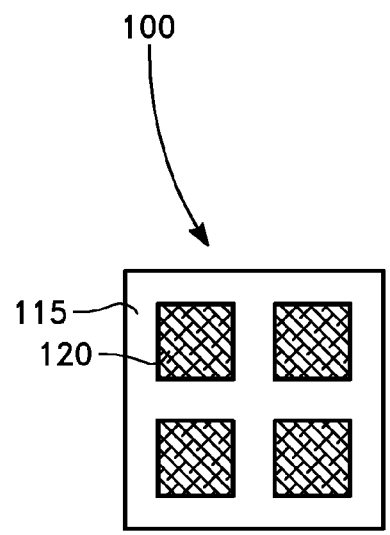
FIG. 1B shows a cut away top view of the vibration control apparatus of FIG. 1A along the 1B-1B line.

FIG. 1A is a simplified illustration showing a cross sectional side view of a vibration control apparatus 100 in accordance with an embodiment of the present invention. FIG. 1B shows a cut away top view of the vibration control apparatus 100 of FIG. 1A. FIGS. 1A and 1B show a basic cellular integration of negative/positive stiffness structures 110/120 within a core 115. Shown is a parallel integration of series chains or stacks of matched, positive and negative stiffness structures 110 and 120 within a positive stiffness porous core 115 in a sandwich panel construction 100. The basic positive/negative stiffness structure 110/120 configuration discloses herein is not limited to a sandwich panel 100, so can be used in a wider variety of structures to provide enhanced damping compared to traditional viscoelastic damping materials.

The structures 110 and 120 may be dispersed uniformly as shown or be lumped together in areas that require increased damping and decreased in areas that require less damping. The concept shown provides damping in a direction normal to the face sheet 105. The intrinsic core 115 shear stiffness will remain large, as required for sandwich panel 100 construction, and the damping in shear is not significantly different than the damping inherent to the porous material of the core 115. In other embodiments (not shown), by canting the negative/positive stiffness arm away from perpendicular to the face sheets, the damping in both shear and compression can be achieved.

There are various design considerations for the positive and negative stiffness structures 110 and 120 shown schematically in FIG. 1A. For damping applications, the negative stiffness structure would have certain ideal characteristics: (1) large stiffness constant per unit area, (2) confinement of motion to a single degree of freedom, (3) long fatigue life and (4) design of scalability and modulation with readily available manufacturing techniques, and (5) wide range of materials (metals, polymers, composites).

The positive and negative stiffness structures 110 and 120 can be embedded in a core 115 of traditional structural materials to enhance the damping and energy absorption properties of these materials. In various embodiments of the sandwich panel 100 structure of FIG. 1A, the core material 115 could provide a typical shear stiffness required to create a high specific stiffness structures, and could provide enhanced damping and energy absorption as compared to traditional core materials.

For example, traditional closed or open cell foam can be partially removed, creating cavities, which can be filled with positive/negative structure 110 and 120 stacks. The volume proportion of stacks can be varied to adjust the relative stiffness and damping properties as are required by application needs. Similar approaches can be employed with traditional honeycomb material. With honeycomb material as the core 115, the positive/negative structure 110 and 120 stacks can be placed within an individual honeycomb cell. Or, a portion of the honeycomb material can be removed, creating a cavity, which can be filled with positive/negative structure 110 and 120 stack. The proportion of filled core 115 cells can be adjusted to meet application needs. Similarly, a periodic lattice structure such as a microtruss material could be utilized for the core 115 material. As such, the core 115 structure may be embodied in accordance with U.S. Pat. No. 7,382,959, entitled OPTICALLY ORIENTED THREE-DIMENSIONAL POLYMER MICROSTRUCTURES, issued on Jun. 3, 2008, by Jacobsen; or U.S. Pat. No. 8,197,930, THREE-DIMENSIONAL ORDERED OPEN-CELLULAR STRUCTURES, issued Jun. 12, 2012, by Jacobsen, et al., both herein incorporated by reference.

Figure 5A:
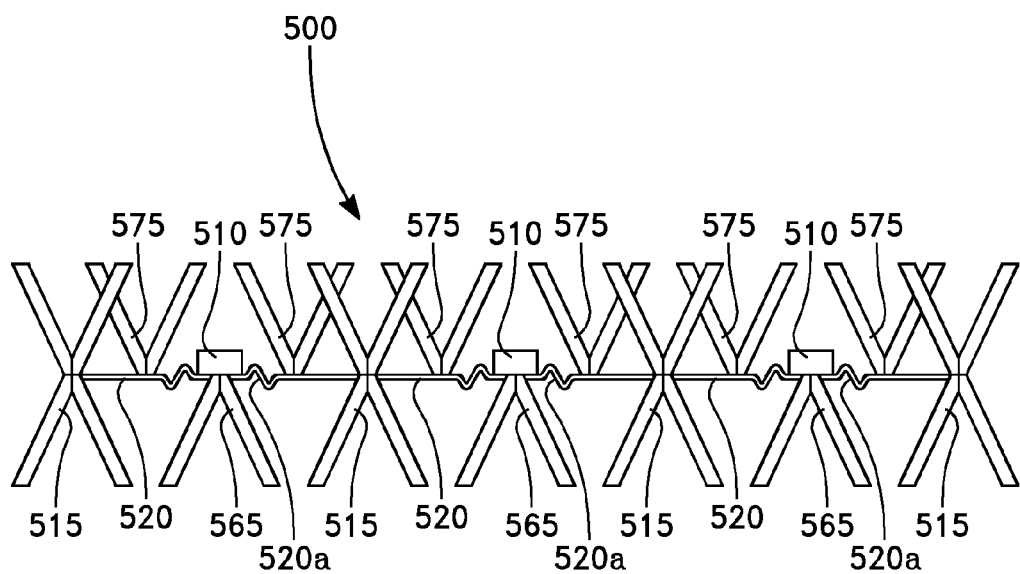
FIG. 5A shows a side view of the example embodiment.
Figure 5B:
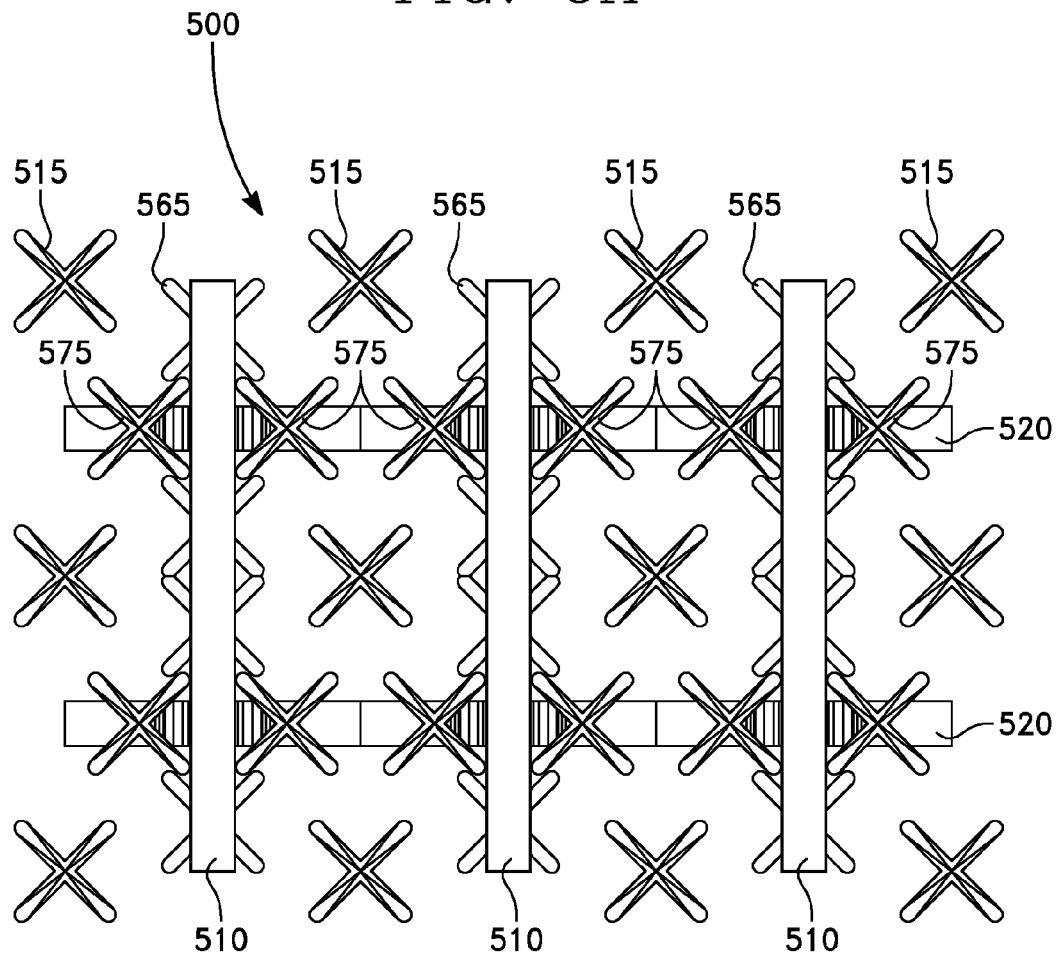
FIG. 5B shows a top view of the example embodiment of FIG. 5A.

In the case of lattice materials, it may be possible to use different designs due to the different concentration of material within the cell volume, such as shown in the embodiment of FIGS. 5A and 5B below. In a lattice material, the negative stiffness damping structure may be connected mechanically in series with the core material.

Possible Negative Stiffness Structures

Figure 2:
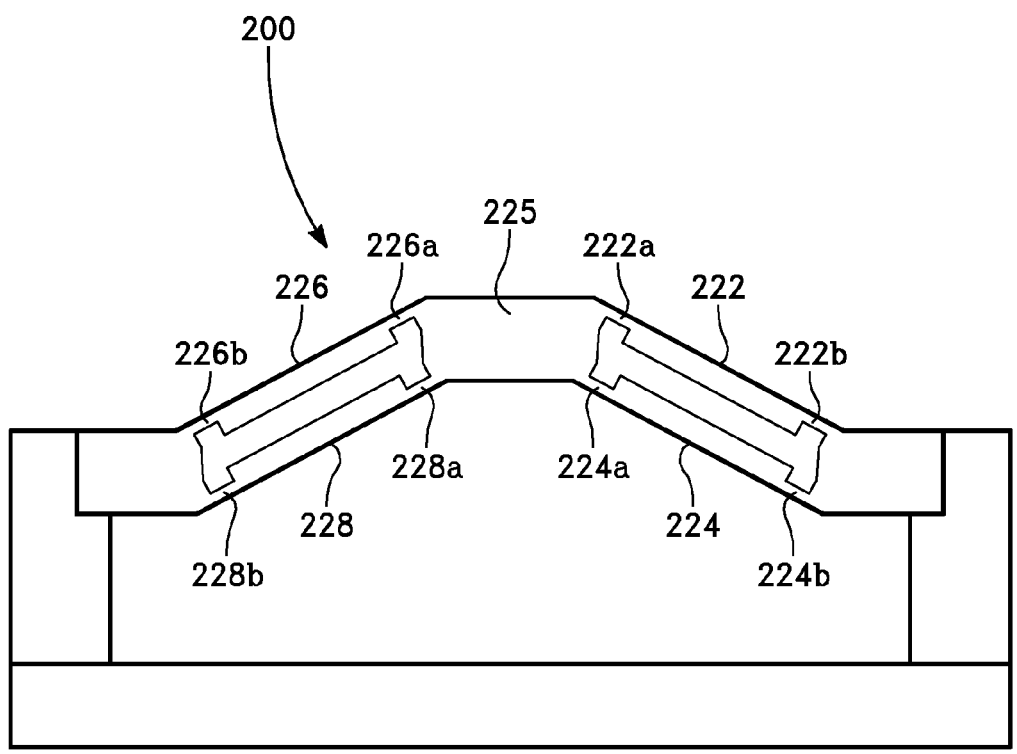
FIG. 2 shows a side view of a possible negative stiffness structure for use in some embodiments.

FIG. 2 shows a side view of a possible negative stiffness structure 200 for use in some embodiments. The negative stiffness structure is disclosed in U.S. patent application Ser. No. 12/784,809, by Geoffrey McKnight, filed May 21, 2010, entitled BISTABLE ACTUATOR MECHANISM, herein incorporated by reference. This design is based on a snap through mechanism but incorporates several features to allow for high specific stiffness values and confinement to one dimensional motion. Overall the structure 200 achieves negative stiffness when the central hub portion is pushed downward to past an instability point. The number of arms and the arm pairs is not limited and could be increased as higher negative stiffness is needed. Each of the arms is loaded primarily in axial compression resulting in the most efficient design possible. Once a particular displacement is reached, the mechanism will snap through and actually increase its displacement with decreasing force (negative stiffness).

While snap through is a well known phenomenon used in thermostats and other devices, our approach incorporates several design features key to a high energy density negative stiffness structure for damping purposes.

In some embodiments, one important feature of this design is the use of (at least) dual arms 222, 224 and 226, 228 on each side of a central hub 225. The central hub 225 can be used to attach matching positive stiffness structures 110 (FIG. 1A). The pair of dual arms 222, 224 and 226, 228 are an innovation that significantly constrains motion to one dimension due to the high resistance to torque about other dimensions. This also increases the stiffness, particularly in the negative stiffness range, by inhibiting asymmetric buckling modes. This is significant to the high stiffness design of some embodiments, since any motion outside of the intended motion direction will result in significant loss of stiffness due to buckling of the axial members. By arranging the members in a box shape, the motion is very highly confined. Increasing the area enclosed by the members creates a torsion box that increases torsional rigidity proportionally to the area enclosed within the box, as described in the above referenced U.S. patent application Ser. No. 12/784,809, by Geoffrey McKnight, filed May 21, 2010, entitled BISTABLE ACTUATOR MECHANISM, incorporated by reference. In some embodiments, the cavity between arms 222, 224 or 226, 228 can be filled with damping materials to improve system damping performance through the shear displacement between arms and also dissipate the vibration due to the snapping to protect the negative stiffness elements.

Referring to FIGS. 1A and 1B, the confinement of motion to one dimension, as discussed above, benefits integration of a matching positive stiffness structure 120 to this embodiment. If the negative structure 120 is constrained, a much wider range of positive structure 110 designs may be used than if the positive structure 110 was used to constrain the negative structure 120. This allows this embodiment to achieve practical scalability to small dimensions.

Also in FIG. 2, the depth of the structure 200 is shown as approximately equal to the length of each arm. In practice, this ratio may be varied as desired to achieve the particular goals. Other embodiments are possible that have the same basic functionality, but with different construction. For example, one possible embodiment may have a structure with connectivity in two directions (such as a cross) rather than just a single direction. Other embodiments may employ an annular disk of material instead of the flat sections shown. All of these design options maintain the same basic negative stiffness and stability characteristics, but can be used to alter the properties to suit particular application needs.

Also shown in FIG. 2, detail of the incorporation of hinges 222a, 222b, 224a, 224b, 226a, 226b, 228a, and 228b into the arms 222, 224, 226, and 228 of the structure 200. This type of arrangement allows scalability. The thinned down hinge sections 222a, 222b, 224a, 224b, 226a, 226b, 228a, and 228b allows the arms 222, 224, 226, and 228 to rotate about the hub axis while simultaneously passing axial loads necessary for high stiffness. In some embodiments the aspect ratio of the hinge lies in a range of 1:2 to 1:5. Given a particular material, it is possible to construct the hinge 222a, 222b, 224a, 224b, 226a, 226b, 228a, and 228b to allow for the necessary degree of rotation by specifying a proper aspect ratio in view of the relationship between strain and bending in the hinge.

The negative stiffness structure 200 can be constructed of a wide variety of materials from metals to polymers and polymer composites. Ideally, the structure 200 possesses a large strain to failure, and a high specific modulus making it a lightweight mechanical energy storage materials. This can be described by the elastic energy in a tensile spring member, $U=\frac{1}{2}\Sigma\epsilon_{max}^2 E$ (where $\epsilon_{max}$ is the safe strain operation limit and E the elastic modulus). Suitable materials include high strength polymers such as polycarbonate, PEEK, PEI, and nylon; metal alloys such as high strength steel, aluminum, and titanium alloys, and polymer composites such as graphite or glass filled epoxy or PEEK. Metallic glasses are also an attractive material choice for this application as they posses high modulus and very large strain to failure. Shape memory alloys which can achieve high reversible strain using stress induced phase changes can also be used for this purpose (materials such as NiTi alloys).

Another consideration for the materials is the ability to injection mold or otherwise fabricate the small structures effectively. Polymers are an attractive choice from this standpoint as are metallic glasses which can be injection molded. The fatigue life of the material must be considered in the design so that the material may support sufficient actuation cycles for the intended application. This will reduce the safe tolerable strain in the material and generally result in a reduced specific negative stiffness value for the overall structure.

Possible Positive Stiffness Structures

Referring to FIG. 1A, to achieve large damping response it is necessary to have a positive stiffness structure 110 in series with the negative stiffness structure 120. The positive stiffness structure 110 should have a high specific stiffness such that a system can keep the required stiffness while having high damping performance. Further, in various embodiments the positive stiffness structure 120 should operate in positive and negative bias, i.e. produce both compressive and tensile forces.

FIGS. 3A-3E show simplified side views of possible positive stiffness structures 300A-300E, respectively. A tension/compression helical coil spring 300A, shown in FIG. 3A, may be used. Or, a block or puck of material 300B that can be exercised in both tension and compression may be used. For the block 300B, a relatively small aspect ratio should be used so that the material does not buckle. Furthermore, the material should accommodate the strain and displacement necessary for the overall design. To increase the strain available, the puck 300B may be engineered through the use of plates, trusses, or foam structures that increase the overall strain capacity while reducing the effective modulus of the spring block 300B. In this way, one may achieve the necessary displacement while maintaining the largest possible force from the structure.

Figure 3A:
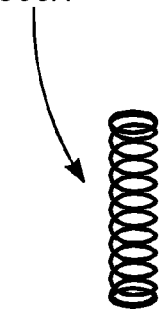
FIGS. 3A-3E show simplified side views of possible positive stiffness structures.
Figure 3B:
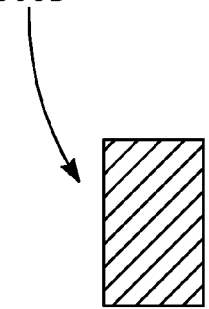

Referring to FIGS. 1A, 3A, and 3B, the preload on the positive stiffness structure 300A or 300B affects the performance of the vibration control apparatus 100. By applying compressed force on the positive stiffness structure 300A or 300B, the vibration control apparatus 100 can be pre-set at, or driven to the critical position which triggers the spontaneous damping. A compressed stress can also be developed throughout the vibration control apparatus 100, which strengthens the vibration control apparatus 100 and makes the vibration control apparatus 100 more robust. By calculating the combination of negative/positive stiffness structures 120, 110, the vibration control apparatus 100 automatic recovery may be achieved. Such an embodiment could be particularly useful for asymmetric incident shock or vibration.

Figure 3C:
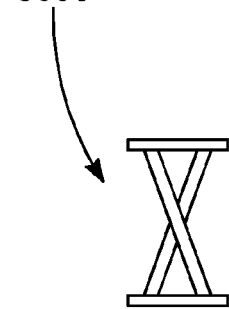

Turning to FIG. 3C, the positive stiffness material may be an engineered structure 300C. FIG. 3C is a simplified illustration of an engineered structure. The engineered structure 300C may comprise engineered microtruss structures such as, for example, that are disclosed in: OPTICALLY ORIENTED THREE-DIMENSIONAL POLYMER MICROSTRUCTURES, U.S. Pat. No. 7,382,959, issued on Jun. 3, 2008, by Jacobsen; THREE-DIMENSIONAL ORDERED OPEN-CELLULAR STRUCTURES, U.S. Pat. No. 8,197,930, issued Jun. 12, 2012, by Jacobsen, et al.; or COMPRESSIBLE FLUID FILLED MICRO-TRUSS FOR ENERGY ABSORPTION, U.S. Pat. No. 8,353,240, issued Jan. 15, 2013, by Schaedler et al., all herein incorporated by reference.

Figure 3D:
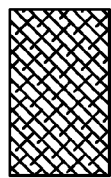

Turning to FIG. 3D, the positive stiffness material may be a porous material 300D. FIG. 3D is a simplified illustration of a porous material. The porous material may have regular, or random, pore size and/or placement.

Figure 3E:
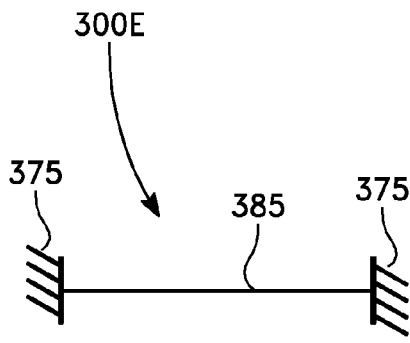

Another design option for the positive structure is the elastic tension member 300E, such as a strip, or a wire/cable, that is tensioned, or is tensionable, as illustrated in FIG. 3E. In this embodiment, two supports 375 are used to hold an elastic member 385 under tension. The elastic member 385 can use various forms including thin strips, wires, cables, etc. For this arrangement, the positive and negative directions have equivalent force response. In addition, the stiffness constant can be made linear with respect to displacement by providing sufficient tension on the strip or wire 385.

This type of spring provides relatively high stiffness constant per unit weight and linear response in negative and positive directions.

In yet another embodiment, a nonlinear positive stiffness element may be used to provide various damping patterns for different applications.

Example Embodiments

Figure 4:
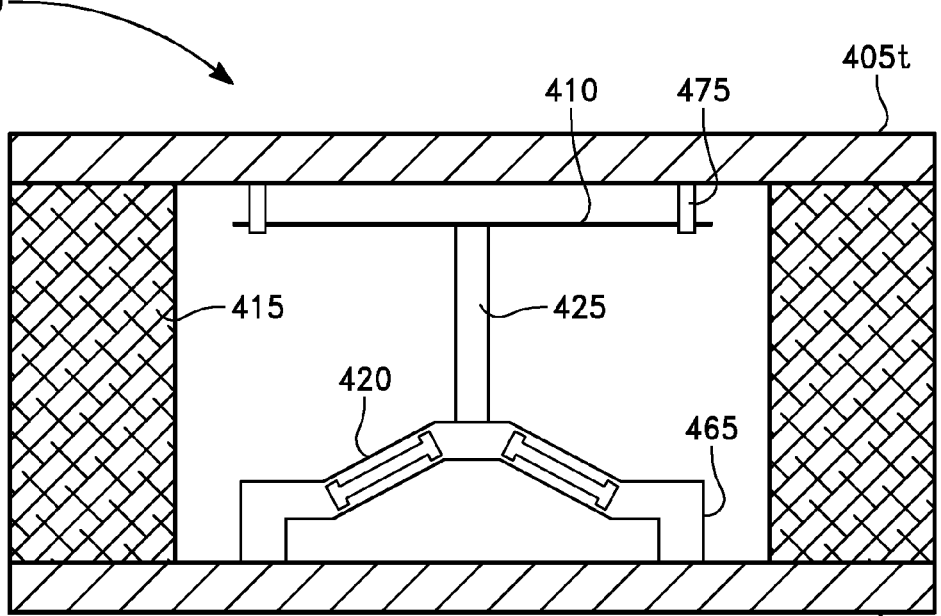
FIG. 4 is a side view of simplified illustration of a vibration control apparatus in accordance with an example embodiment.

FIG. 4 is a side view of simplified illustration of a vibration control apparatus 400 in accordance with an example embodiment. In this embodiment, the positive stiffness structure is a tension wire 410. The tension held by supports 475 to face sheet 405t. The support connector 475 may be a positive stiffness material, or simply rigid supports that are coupled to or part of the face sheet 405t. Similarly, support connectors 465 connect the negative stiffness structure 420 to the face sheet 405b. The tension wire 410 is coupled via connecting member 425 to a negative stiffness structure 420. The connecting member 425 may be a positive stiffness material, or simply a rigid connecting member coupling the tension wire 410 to the negative stiffness member 420. The positive and negative stiffness structure 410 and 420 stack is embedded in a core 415. P-foam, such as P600 naval foam, can be utilized as the core 415 material. Structural core foam, such as marine P-foam, for example CORECELL™, is commercially available, from Gurit Inc., located in Bristol, R.I., w.gurit.com, or through its suppliers.

As with other embodiments, the unit cell embodiment of the vibration control apparatus 400 may be scaled if desired and formed into arrays of unit cells of individual unit cells with various symmetries, or into linear arrays, i.e. in a cross pattern.

For the embedded unit cells, the positive/negative cell units can be arrayed with the material in a variety of fashions. If utilizing individual units of negative/positive structures, several different symmetries for the placement/embedding of these units within another material are possible. These may include threefold, fourfold, and sixfold symmetries. The spacing and size of the units is determined by the application needs, but should be controlled such that the expected vibration and other application loads produce the appropriate force levels on the positive/negative structures to ensure damping. Further, the units should be sufficiently small to distribute the applied load to connecting face sheets.

Referring to FIGS. 5A and 5B, an array embodiment 500 may be constructed through the use of strips of negative stiffness structures 510 and positive stiffness structures 520 arrayed within a core, such as microtruss core 515. FIG. 5A shows a side view of the example embodiment 500. FIG. 5B shows a top view of the example embodiment 500. The positive and negative member strips 520 and 510 are arranged orthogonally and then attached so that each junction creates another positive/negative node and thus another damping loop. Force is transmitted to the positive stiffness structure 520 via microtruss conduits 575, which may connect to a face sheet (not shown). Similarly, force is transmitted to the negative stiffness structure 510 via microtruss conduits 565, which may connect to a face sheet (not shown). Or, in some embodiments, the microtruss conduits 575 and/or 565 may be comprised of core material, or be connected to core material (not show). As with the embodiment of FIG. 4, the microtruss conduits 575 or 565 may be positive stiffness material, or rigid material, as desired for a particular application.

FIGS. 5A and 5B show one example embodiment 500 utilizing the concept of using linear strips of positive and negative structures 520 and 510 that cross to form tuned elastic structures. This embodiment 500 is constructed with microtruss core 515 materials, but, this embodiment can alternatively be constructed with other lightweight materials such as foam, honeycomb, etc. Furthermore, as discussed above, although the embodiment of FIGS. 5A and 5B is shown without face sheets, optional face sheets may be included.

In any of the embodiments, a face sheet as used herein may be a surface, a panel, a wall, or the like of the same structure, or of another structure, component, part, device, or the like, which is abutting, adjacent to, next to, close to, or mounted with the core. Furthermore, although a face sheet as shown herein may be a broad generally flat continuous surface, it need not in all embodiments be such. Instead, a face sheet as used herein may have a different shape, thickness, surface feature, or size, and need not be continuous.

In various embodiments, the core may be a solid material that has a portion removed to accommodate a positive/negative stiffness stack. Or, the core material may be built up around the positive/negative stiffness stack, for example through an additive process.

Figure 6:
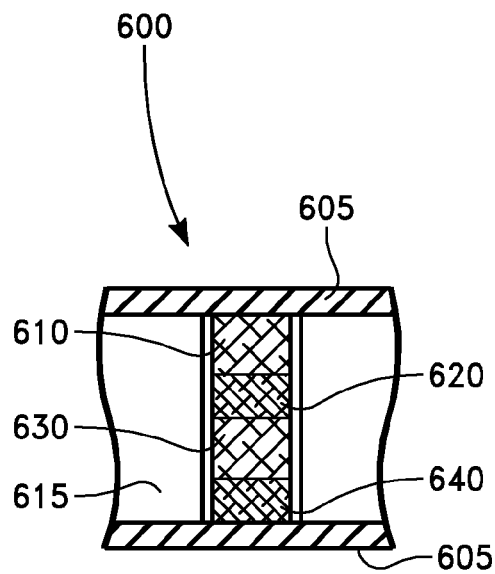
FIG. 6 shows a cut away side view of a portion of an embodiment having multiple series connected positive stiffness structures and multiple negative stiffness structures, within face sheets.

FIG. 6 shows a cut away side view of a portion of an embodiment 600 having multiple series connected positive stiffness structures 610 and 630 and negative stiffness structures 620 and 640, within face sheets 605. The two positive stiffness structures 610 and 630 and two negative stiffness structures 620 and 640 are interleaved, i.e. arrange in alternate layers, and are in series with each other. The multiple series connected positive stiffness structures 610 and 630 and negative stiffness structures 620 and 640 stack is in parallel with a positive stiffness core material 615.

Providing series connected positive and negative stiffness material members 610, 620, 630, and 640 allows further tailorability of the absorption profile for a system. The multiple matched pairs 610, 620 and 630, 640 of positive and negative and stiffness structures are stacked in series through the thickness of the core material 615 to provide controllable stiffness and damping properties. For example, a series of different negative/positive stiffness structure combinations activated at different displacement levels may be provided to extend damping over a broader range of input conditions. An example result of this concept is demonstrated by the plot 700 in FIG. 7.

Figure 7:
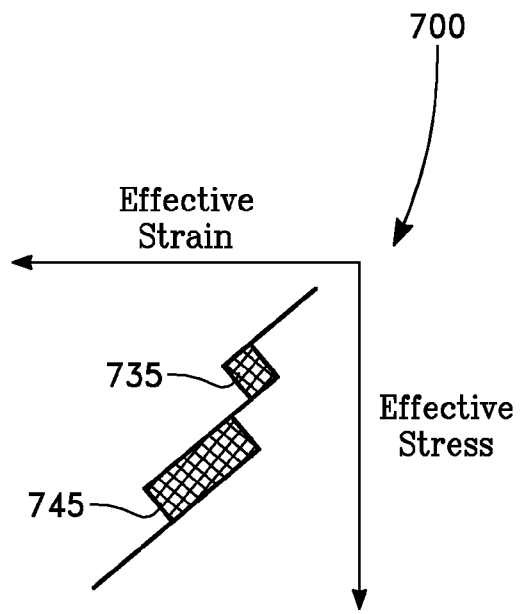
FIG. 7 shows an example the effective strain versus effective stress plot illustrating the type of behavior possible from the embodiment FIG. 6.

FIG. 7 shows an example the effective strain versus effective stress plot 700 illustrating the type of behavior possible from the embodiment 600 of FIG. 6. The first loop 735 is activated at a particular amount of pressure is controlled by the k1 and k2 of positive and negative stiffness structures 630 and 640, while the second loop 748 is controlled by the k3 and k4 of the positive and negative stiffness structures 610 and 620.

Thus, to obtain arbitrary damping and mechanical response profiles, different combinations of structures are combined in parallel and series. For example, a low force rapid response structure may be combined in series with a large force slower response structure so that the small structures take up small vibrations and loads to the system, and the large structure absorbs large loads to the system. Thus, a first part of the structure is able to absorb small deflection, possibly high frequency energy, while a second part absorbs the large deflection, possibly low frequency energy. This stacking concept also can provide a smooth damping cycle, which inhibits the snap-induced shocking.

Figure 8:
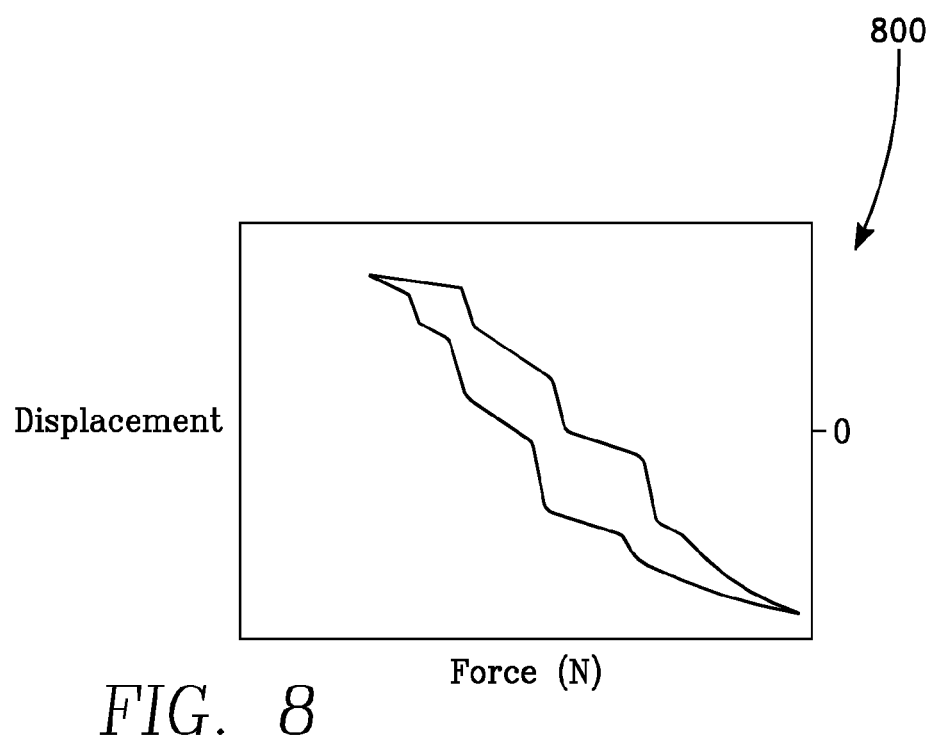
FIG. 8 is a simplified example plot of a potential force versus displacement for an embodiment in accordance with FIGS. 1A and 1B having four negative stiffness structures of nearly equal characteristics.

FIG. 8 is a simplified example plot 800 of a potential force versus displacement for an embodiment in accordance with FIGS. 1A and 1B having four negative stiffness structures of nearly equal characteristics. Sudden changes in the force displacement curve result from individual negative stiffness events within the structure. Putting structures in parallel provides broader absorption peaks and redundancy across a component.

Referring to the plot 800, shown is an example dispersion of energy absorption behavior when the negative stiffness structures each have slightly different characteristic snap-through, i.e. the snap-throughs of the individual cells are not in synchronization. Looking at the response in the FIG. 8, the damping behavior was observed to occur over a broader displacement range than is possible with a single positive/negative stiffness structure. Expanding to the situation of massively parallel structures for large structural units like panels, or beams, it is expected that the response would be smoothed, and that the natural dispersion of behavior from negative/positive stiffness structures would result in a broader absorption peak in displacement space.

In yet other embodiments, combining the series and parallel structures, it will be possible to program the response of the structure to a variety of input loads. The response will occur passively, that is to say no actuators and controllers are required, but rather the structure will automatically provide a required response. This allows tailoring of the response of the structure to known environmental and working loads. In practice, this may be useful, for example, in the case of an ocean going vessel constructed of sandwich panels. The panels could be made to respond non-linearly to normal loads, incurred from crashing into waves, so that operation in different sea conditions may be optimized for safety and structural robustness In various embodiments, it is possible to provide compact, high energy density negative/positive stiffness structures suitable for scaling down in size and embedding within host materials to increase damping. In some embodiments, it is possible to provide a low frequency damping structures effective at extreme temperatures and extremely low vibration frequencies. In various implementations, methods and embodiments are possible for creating anisotropic damping such that stiffness in the primary structural direction is maintained, while damping from other loads is increased. For example, in structural sandwich panels, it is possible to maintain high shear stiffness for the structural panel, but provide increased damping and compliance for normal directions. In some implementations, methods and embodiments for integration of negative/positive stiffness structures into cellular and micro-truss materials are possible.

In various embodiments, it is possible to create very high energy density negative structures with small dimensions into typical core structure dimensions of 5-15 mm of thickness. Furthermore, various embodiments can provide much higher energy density than previously disclosed structures, achieving 10-100× increases in specific damping capacity (defined as E/ρ tan δ, where is the elastic storage modulus, ρ the material density, and tan δ the loss tangent describing energy absorption per unit cycle as typically used in the literature).

Various embodiments create an efficient shock absorber and vibration damper with superior damping performance, scalable manufacturing, light-weight design, and good structural strength. Some embodiments can have specific damping capacity energies much higher than currently available material. In engineering terms, this will decrease the volume and weight of material necessary to achieve damping of structural vibrations and impulse loads. Thus, various embodiments can significantly reduce necessary material weight and volume.

One discriminator between some embodiments and traditional viscoelastic damping is that it can be inherently rate insensitive. This is especially true for low frequency 10 Hz and below where traditional viscoelastic materials and constrained layer damping treatments are less effective. One key application for this feature is that of large low stiffness structures, such as those used in space structures that exhibit low frequency oscillation resulting from thermal and solar loading variations. This technology may provide enhanced damping over current methods for these applications Further potential advantages that may be accrued using this approach are application specific damping performance. Damping may be designed so that it is active under certain application performance regimes and not active under other regimes. This may be useful, for example, in the case of a structure that must be stiff under normal working conditions and does not require damping, but under extreme events requires additional energy absorption. Various embodiments will allow this type of performance. Specific applications of this technology are composite sandwich structures such as those used in ship and aircraft construction, spacecraft or other engineered systems. Further, as discussed above, various embodiments create a inherently rate insensitive damping mechanism that is use for wide frequency ranges, especially low ranges such as in large space structures, where current methods do not perform well.

Various embodiments are potentially useful across a broad range of implementations, which would significantly benefit from a broadband, planar, efficient shock/vibration absorber. For example, some embodiments may be employed in space structures such as large solar or antenna arrays, naval structures such as littoral craft and composite deck structures, rotorcraft structures such as the transmission housing, and land vehicles such as cars, trucks, military personnel carriers, etc.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment(s) illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or member can actually be representative or equivalent members. Again, these are implicitly included in this disclosure. Where the invention is described in device-oriented terminology, each member of the device implicitly performs a function. It should also be understood that a variety of changes may be made without departing from the essence of the invention. Such changes are also implicitly included in the description. These changes still fall within the scope of this invention.

Further, each of the various members of the invention and claims may also be achieved in a variety of manners. This disclosure should be understood to encompass each such variation, be it a variation of any apparatus embodiment, a method embodiment, or even merely a variation of any member of these. Particularly, it should be understood that as the disclosure relates to members of the invention, the words for each member may be expressed by equivalent apparatus terms even if only the function or result is the same. Such equivalent, broader, or even more generic terms should be considered to be encompassed in the description of each member or action. Such terms can be substituted where desired to make explicit the implicitly broad coverage to which this invention is entitled. It should be understood that all actions may be expressed as a means for taking that action or as a member which causes that action. Similarly, each physical member disclosed should be understood to encompass a disclosure of the action which that physical member facilitates. Such changes and alternative terms are to be understood to be explicitly included in the description.

While the present invention has been described in connection with certain exemplary embodiments, it is to be understood that the invention is not limited to the disclosed embodiments; on the contrary, it is intended to cover various modifications and equivalent arrangements included within the spirit and scope of the appended claims, and equivalents thereof.

What is claimed is:

1. A vibration control apparatus comprising:
    a) a pair of face sheets with a core material extending therebetween, the core material comprising a positive stiffness material;
    b) a stack located between the pair of face sheets in parallel with the core material, the stack comprising a positive stiffness structure in series with a negative stiffness structure; and
    c) wherein the core material comprises a cavity and wherein the stack is located within the cavity.

2. The vibration control apparatus of claim 1, wherein the core material comprises at least one of: (a) foam; (b) honeycomb; or (c) an engineered structure.

3. The vibration control apparatus of claim 2, wherein the core material comprises a microtruss structure.

4. The vibration control apparatus of claim 1, wherein the positive stiffness structure of the stack comprises at least one of: (a) a coil; (b) a block; (c) a microtruss structure; (d) a porous material; (e) a tension wire; or (f) a tension strip.

5. The vibration control apparatus of claim 1, wherein the negative stiffness structure of the stack comprises at least two pairs of arms connected to a hub.

6. The vibration control apparatus of claim 1, wherein the negative stiffness material of the stack comprises a snap-through device that substantially constrains motion to one dimension.

7. The vibration control apparatus of claim 1, wherein the vibration control apparatus comprises a plurality of the stacks in parallel with each other.

8. The vibration control apparatus of claim 7, wherein the plurality of stacks are dispersed uniformly throughout the core.

9. The vibration control apparatus of claim 7, wherein the plurality of stacks are dispersed non-uniformly throughout the core.

10. The vibration control apparatus of claim 1, wherein the vibration control apparatus comprises a plurality of stacks and wherein at least a portion of the plurality of stacks are canted with respect to the pair of face sheets.

11. The vibration control apparatus of claim 1, wherein the stack further comprises a second positive stiffness structure in series with a second negative stiffness structure.

12. A vibration control apparatus comprising:
    a) a pair of face sheets with a core material extending therebetween, the core material comprising a positive stiffness material;
    b) a stack located between the pair of face sheets in parallel with the core material, the stack comprising multiple positive stiffness structures in series with multiple negative stiffness structures; and
    c) wherein the core material comprises a cavity and wherein the stack is located within the cavity.

13. The vibration control apparatus of claim 12, wherein the multiple positive stiffness structures are interleaved with the multiple negative stiffness structures.

14. The vibration control apparatus of claim 13, wherein the stack comprises:
    a) first and second positive stiffness structures in series;
    b) first and second negative stiffness structures in series with each other and in series with the first and second positive stiffness structures; and
    c) wherein the first positive stiffness structure is located adjacent to the first negative stiffness structure, and wherein the second positive stiffness structure adjacent to the first negative stiffness structure, and wherein the second negative stiffness structure adjacent to the second positive stiffness structure.

15. A vibration control apparatus comprising:
    a) a pair of face sheets with a core material therebetween, the core material comprising a positive stiffness material;
    b) a stack located between the pair of face sheets in parallel with the core material, the stack comprising a positive stiffness structure in series with a negative stiffness structure; and
    c) wherein the stack is surrounded by the core material.

16. The vibration control apparatus of claim 15, wherein the stack is embedded within the core material.

17. The vibration control apparatus of claim 15, wherein the core material comprises a cavity and wherein the stack is located within the cavity.

18. The vibration control apparatus of claim 15, wherein the core material comprises at least one of: (a) foam; (b) honeycomb; or (c) an engineered structure.

19. The vibration control apparatus of claim 18, wherein the core material comprises a microtruss structure.

20. The vibration control apparatus of claim 15, wherein the positive stiffness structure of the stack comprises at least one of: (a) a coil; (b) a block; (c) a microtruss structure; (d) a porous material; (e) a tension wire; or (f) a tension strip.

21. The vibration control apparatus of claim 15, wherein the negative stiffness material of the stack comprises a snap-through device that substantially constrains motion to one dimension.

22. The vibration control apparatus of claim 1, wherein the negative stiffness structure comprises a plurality of arms on each side of a central hub, the plurality of arms being mounted to one of the pair of the face sheets at distal ends from the central hub.

23. The vibration control apparatus of claim 22, wherein the plurality of arms on each side of a central hub form a cavity between adjacent ones of the plurality of arms, and wherein the cavity on each side of the central hub between adjacent ones of the plurality of arms comprises damping material.

* * * * *